Dec. 20, 1966  W. ZEBROWSKI ETAL  3,293,345
PROCESS FOR THE EJECTION OF MOLDED PLASTIC PARTS FROM HOT MOLDS
Filed Sept. 5, 1962
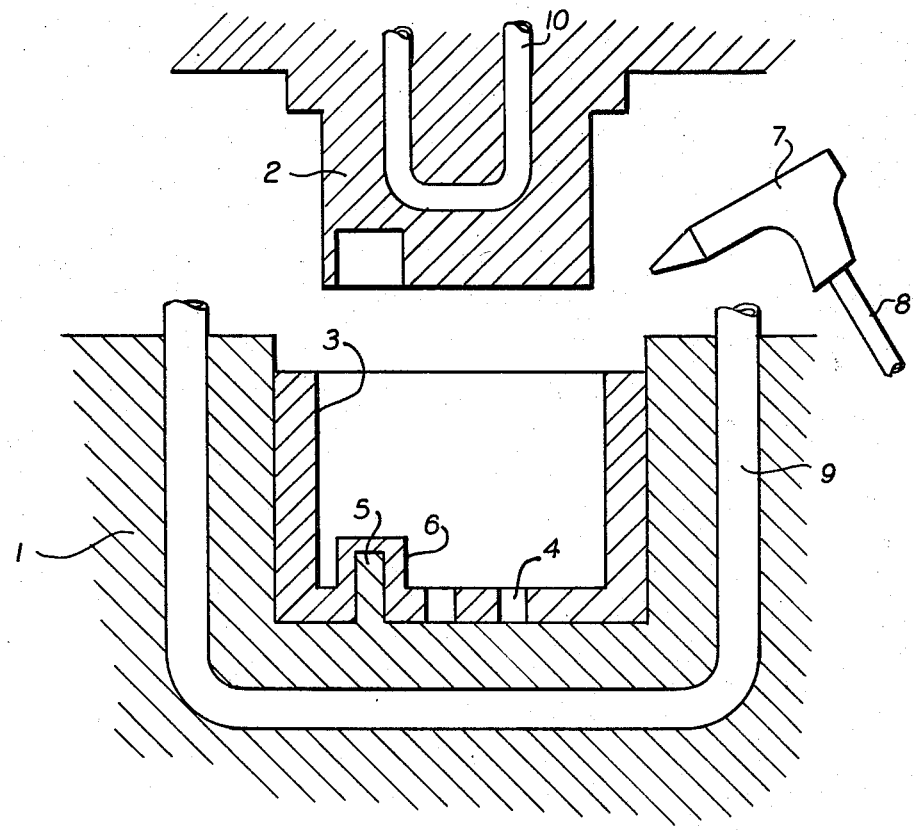
INVENTORS
WILLY ZEBROWSKI
ERICH BEHR
BY
Burgess, Dinklage & Sprung
ATTORNEYS.

3,293,345
PROCESS FOR THE EJECTION OF MOLDED PLASTIC PARTS FROM HOT MOLDS
Willy Zebrowski and Erich Behr, Troisdorf, Bezirk Cologne, Germany, assignors to Dynamit Nobel Aktiengesellschaft, Troisdorf, Bezirk Cologne, Germany, a corporation of Germany
Filed Sept. 5, 1962, Ser. No. 221,421
Claims priority, application Germany, Sept. 14, 1961, D 37,036
5 Claims. (Cl. 264—334)

Plastics on a basis of, for example, polyethylene, which usually contain carbon black as filler in addition to a cross-linking agent, can, in the same manner as the known plastic substances made of phenol-formaldehyde resins, be made under heat and pressure into hardened finished parts with outstanding mechanical and thermal properties. The pressing process will be economical, however, only if the finished parts can be ejected from the mold without cooling and reheating the said mold, that is, if the parts have sufficient rigidity at the hardening temperature, which is approximately 200° C. in the case of polyethylene cross-linked with peroxides, and if they are capable of withstanding the forces produced in the mold stripping process by ejectors, for example, without destruction of the material.

However, cross-linked, hardened polyethylene is a rubber-elastic material at the hardening temperature and therefore it can be stripped easily from the molds in this state only in the case of parts of simple shape which have no great tendency to stick in the molds. In the case of complex parts, especially those with metal inserts, which can be ejected only by a fairly great force, the danger of the destruction of the parts exists. In such cases, this has been remedied hitherto by cooling the mold until the desired rigidity of the finished part has been brought about. Aside from the fact that this process is uneconomical, its use is limited by the shrinkage of the material, which amounts to approximately 3.5% during cooling to room temperature, and can result in a seizing of the parts in the mold.

According to the present invention, the difficulties described in connection with the ejection process can be eliminated by spraying the surface of the finished part remaining in the male or female part of the mold when the latter is separated, with a liquid having the greatest possible heat of evaporation and evaporating at the hardening temperature used, such as water, and doing so for a brief period of time until sufficient rigidity is achieved in the part for its easy ejection. The spraying time is governed by the wall thickness and the complexity of the parts. In the case of the usual wall thicknesses, it averages approximately 10 seconds, due to the rapid removal of the surface heat due to the high heat of evaporation. The temperature of the mold itself is not substantially lowered, and the heating does not need to be shut off, so that the normal pressing cycle is retained. Surprisingly, the production of internal tensions and cracks, which is to be expected in molded parts made from the usual thermosetting or thermoplastic substances when they are chilled on one side, does not occur in this case. The spray guns commonly used for spray painting can be used for spraying the coolant, and the working cycle of these guns can, of course, be automatically controlled.

Where the removal is carried out under ambient pressure conditions, the liquid can be any liquid having a normal boiling point below the temperature of the article in the hot condition. Water is a preferred liquid and is well suited for use where the temperature of the article in the hot conditions is above 100° C. The liquid preferably has a high heat of evaporation.

The process of the invention is suitable for all molded plastic parts which tolerate chilling, and is especially suited for use in respect to molded articles of cross-linked polyolefin, wherein the cross-linking occurs during the molding under heat provided by the hot condition of the mold. The polyolefin can be a homopolymer or copolymer and can be of ethylene, propylene or butylene. The cross-linking can occur during the molding and under the application of heat and pressure. The molded articles can be of other materials, for example, chemically cross-linked thermoplastics having rubber-elastic properties at the hardening temperature similar to those exhibited by cross-linked polyethylene.

*Example*

Molded casing parts measuring 97 x 92 x 48 mm. and with a wall thickness of 4–15 mm., a lateral hole 11.5 mm. in diameter, 2 embedded M4 knurled nuts and 2 embedded pins 3 mm. in diameter, which hitherto have been produced without difficulty from a phenolic molding compound in a mold made for this purpose, are to be made from cross-linked polyethylene.

*Case 1.*—Pressing temperature 185° C., hardening time 6 minutes.

*Case 2.*—Pressing temperature 185° C., hardening time 6 minutes, spraying time 12 seconds (water).

In Case 1, the ejector pins pierce through the rubber-elastic material and the embedded metal parts tear out and remain stuck to the holding pins.

In Case 2, the water is sprayed so that all water contacts the exposed surface of the plastic. The parts are stripped from the molds without the material being damaged thereby and without tearing out the metal parts.

The invention is further illustrated in the accompanying drawing wherein a two-part mold is shown with the male part withdrawn and the molded article in the female part. In the drawing, a two-part mold is made up of the female member 1 and the male member 2, and these mold parts are outfitted, respectively, with steam pipes 9 and 10 for providing suitable heat. The molded article 3, shown in the mold cavity is provided with a metal insert 4, and, further, has a recess 6. The female member has an extension 5 corresponding to the recess 6 of the molded article. Following the molding, the male member 2 is withdrawn from the female member 1, and the molded article 3 remains in the cavity. The article is then sprayed with water with the spray gun 7 connected to the water supply line 8. The spray gun 7 is a hand tool which can be shifted as is appropriate to provide a uniform spraying of the molded article.

What is claimed is:

1. In the production of plastic articles by molding under heat and pressure wherein the article is molded in a multipart mold while the mold is hot and following the molding, at least one mold part is removed to provide the molded article ready for removal from a remaining mold part with a portion of the surface of the article exposed and a portion of the surface thereof in contact with the remaining mold part and while the remaining mold part is hot and the article is hot, and the article in hot condition is susceptible to injury upon application thereof of a force for the removal thereof from the remaining mold part but in a relatively cool condition is of sufficient strength for the removal, the step of contacting exposed surface of the article with a liquid which evaporates on such contacting taking heat from the article to cool it so that the article can be removed from the remaining mold part without injury thereto, and the step of removing the article following said contacting, the remaining mold part being supplied with heat for the molding and the supply of heat being continued during said contacting and the removal of the molded article, whereby the article is removed without substantial cooling of the remaining mold part.

2. Production of molded articles according to claim 1, wherein the article in hot condition is above 100° C. and the liquid used for the contacting is water.

3. Production of molded articles according to claim 1, wherein the molded article is of cross-linked polyolefin and the cross-linking occurs during the molding under heat provided by the hot condition of the mold.

4. Production of molded articles according to claim 3, the polyolefin being polyethylene.

5. Production of molded articles according to claim 3, the temperature of the article in the hot condition being about 200° C., and the liquid used for the contacting being water.

References Cited by the Examiner

UNITED STATES PATENTS

| | | | |
|---|---|---|---|
| 2,349,177 | 5/1944 | Kopitke | 18—56 X |
| 3,019,488 | 2/1962 | Doyle et al. | 18—56 |
| 3,084,389 | 4/1963 | Doyle. | |

ROBERT F. WHITE, *Primary Examiner.*

ALEXANDER H. BRODMERKEL, *Examiner.*

M. R. DOWLING, *Assistant Examiner.*